(No Model.) 3 Sheets—Sheet 1.

S. DAVIS.
CORN PLANTER AND MARKER.

No. 357,470. Patented Feb. 8, 1887.

WITNESSES
B. Fugitt,
P. C. Masi.

INVENTOR
Samuel Davis
by Audmom Smith
ATTORNEYS

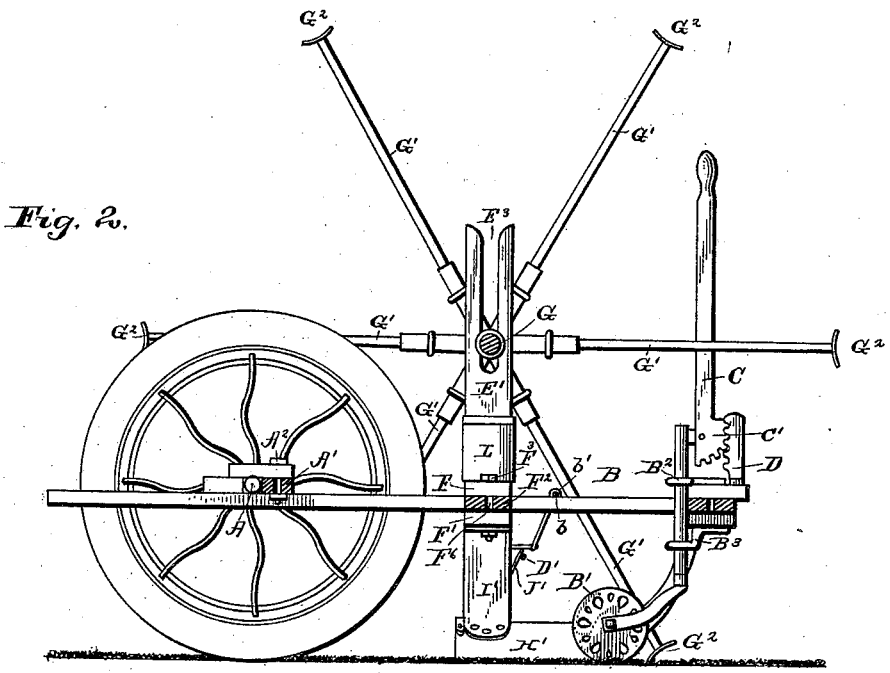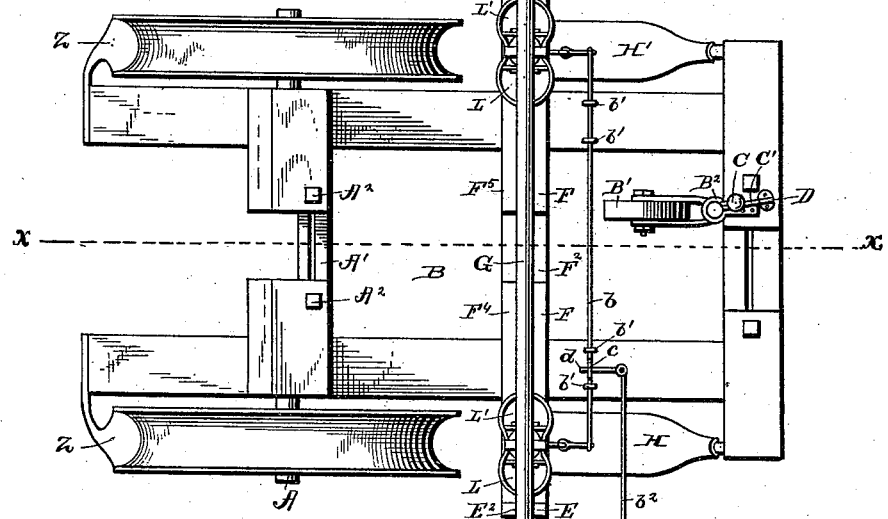

(No Model.) 3 Sheets—Sheet 3.

S. DAVIS.
CORN PLANTER AND MARKER.

No. 357,470. Patented Feb. 8, 1887.

WITNESSES
B. Fugitt.
P. C. Masi.

INVENTOR
Samuel Davis,
by Anderson & Smith
ATTORNEYS

N. PETERS, Photo-Lithographer, Washington, D. C.

UNITED STATES PATENT OFFICE.

SAMUEL DAVIS, OF MOUNT VERNON, OHIO.

CORN-PLANTER AND MARKER.

SPECIFICATION forming part of Letters Patent No. 357,470, dated February 8, 1887.

Application filed June 3, 1886. Serial No. 204,035. (No model.)

*To all whom it may concern:*

Be it known that I, SAMUEL DAVIS, a citizen of the United States, residing at Mount Vernon, in the county of Knox and State of Ohio, have invented certain new and useful Improvements in Corn-Planters and Markers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
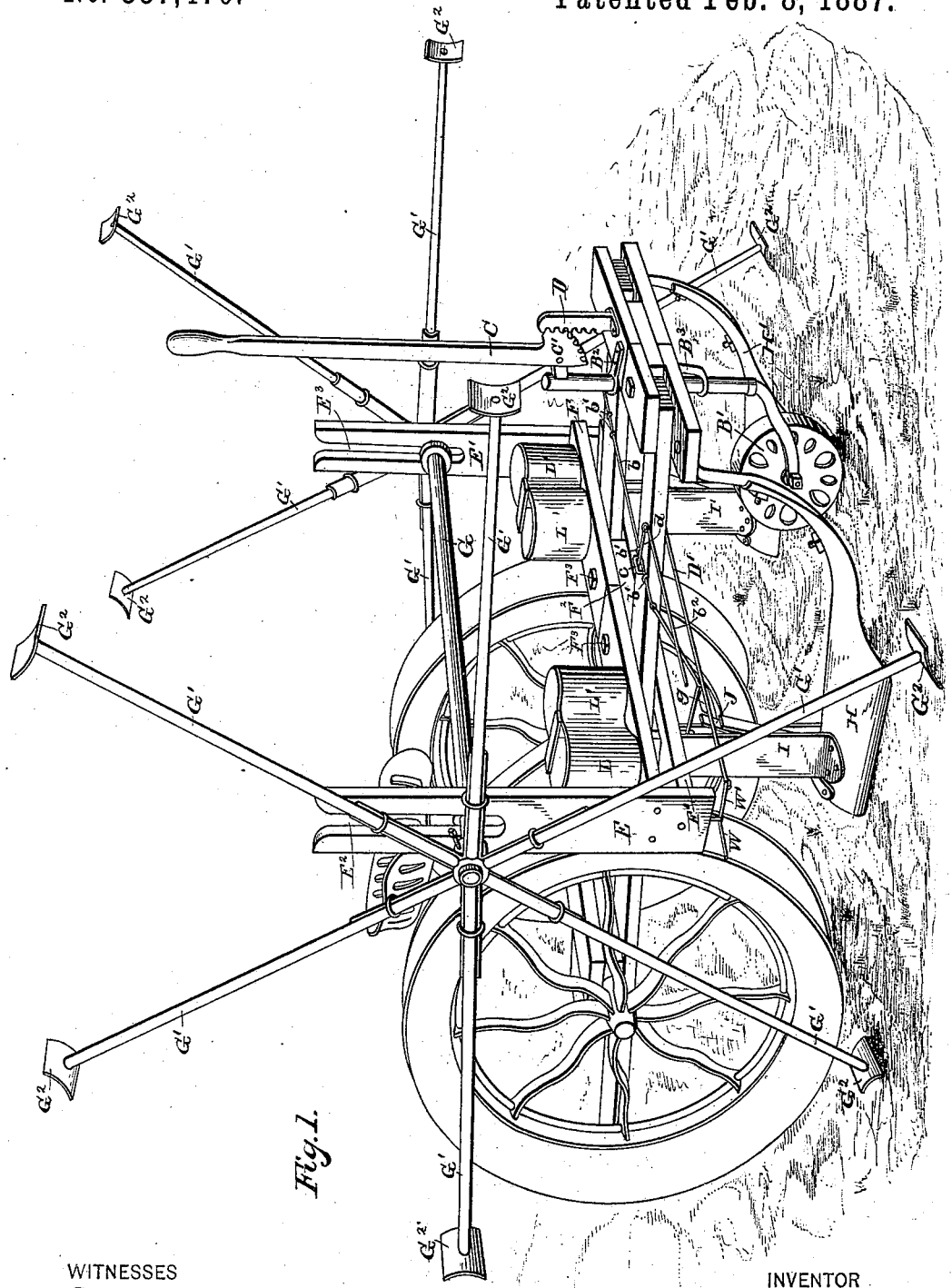
Figure 4:
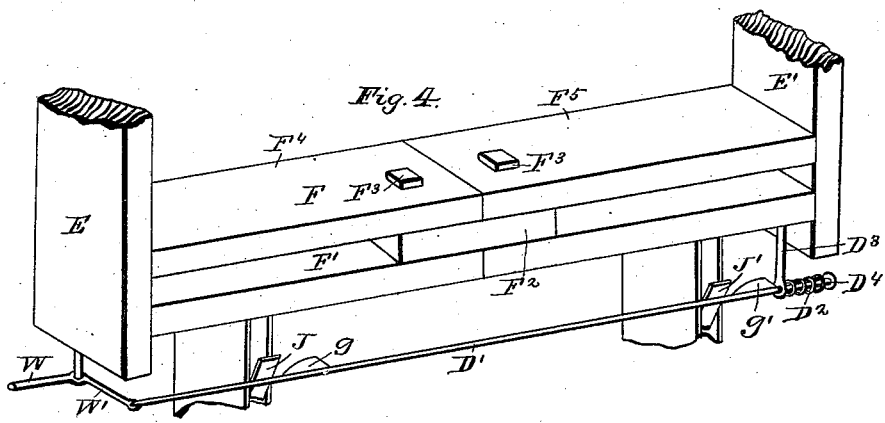
Figure 5:
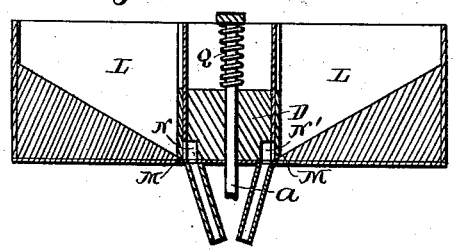
Figure 6:
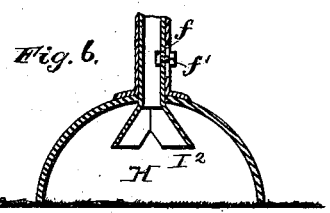
Figure 7:
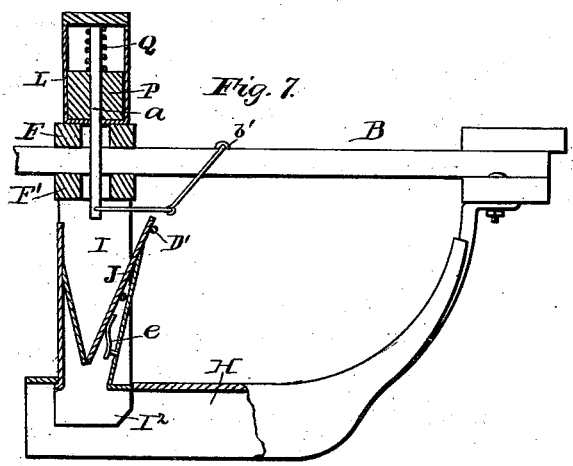
Figure 8:
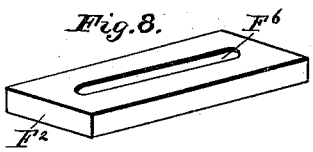
Figure 9:
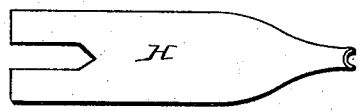

In the drawings, Figure 1 is a perspective view of my corn-planter, marker, and fertilizer-dropper. Fig. 2 is a vertical longitudinal section of the same, taken on line $x\,x$ in Fig. 3. Fig. 3 is a plan view showing the machine arranged to plant the rows farthest apart. Fig. 4 is a detail view showing mechanism for operating the inclined valves. Fig. 5 is a vertical section of one of the hoppers. Fig. 6 is a cross-section of one of the shoes. Fig. 7 is a detail sectional view taken through one of the hoppers and shoes. Fig. 8 is a detail view of one of the slotted tie-plates of the frame, and Fig. 9 is a top view of one of the shoes, showing slot.

My invention relates to corn-planters and fertilizer-droppers; and it consists in the construction and novel combination of parts, as hereinafter described, and pointed out in the claims.

Referring by letter to the accompanying drawings, A designates the axle of the machine, said axle being made adjustable longitudinally by means of the slotted tie-plate $A'$ and bolts $A^2$, so that the machine may be adjusted to plant the rows nearer to or farther from each other, as may suit the wishes of the farmer.

B designates the frame of the machine, which is mounted on the axle A, located near the rear end of the frame, and is supported at its front end upon a caster-wheel, $B'$, the stem of which is journaled in bearings $B^2\,B^3$ at the front end of the frame, and is connected at its upper end to the hand-lever C, and forms the fulcrum therefor.

The transverse bars $F\,F'$ of the frame B are sectional bars—that is, they are made in two sections—and are connected by slotted tie-plates $F^2$, bolts $F^3$ being passed down through bolt-holes near the inner ends of the sections $F^4\,F^5$ and through the slots $F^6$ in the slotted tie-plates $F^2$, so that the frame can be adjusted laterally when the axle is adjusted to move the dropping mechanism, so that it will drop the seed in the furrow when said adjustments have been made.

The reciprocating rod $D'$ is connected at one end to the front end of the angle-lever $W'$. This rod $D'$ is encircled at one end by a spiral spring, $D^2$, which bears against the depending supporting-arm $D^3$ at one end, and is held in place on said rod $D'$ by a nut or collar, $D^4$. The rod $D'$ is provided with curved projections $g\,g'$ near the upper ends of the inclined valves $J\,J'$, which projections strike the upper ends of said inclined valves and operate them when the rod $D'$ is moved by the marker-arms, striking the arm W of the angle-lever, and when the marker-arm slips from the arm W the spring retracts the reciprocating rod and holds it in readiness to be struck by the next marker-arm. The covering-shoes are made vertically adjustable on the discharge-tubes by bolts $f$, passed through holes in the discharge-tubes, near the lower ends of the latter, from within outwardly, said bolts $f$ being secured in place by nuts $f'$, whereby said shoes may be held to their adjustments above the scatterer.

At its lower end the lever C is provided with a toothed segmental cam, $C'$, the teeth of which engage the teeth of the vertical rack D, secured to the front transverse cross-bar of the frame B, so that the front end of the frame may be raised and lowered at the will of the driver.

$E\,E'$ are vertical standards secured to the ends of the transverse parallel bars $F\,F'$, said vertical standards $E\,E'$ being slotted at $E^2\,E^3$ to form the bearings for the marker-shaft G, which latter is provided at each end with radial arms $G'$, having marking-shoes $G^2$ to mark the ground, so that the driver can plant the grain in rows. The marker-shaft G plays up and down in vertical slots, and accommodates the marker to the unevenness of the ground. The marker-arms $G'$ are adjustable in their securing-hubs, so that they may be shortened to cause them to mark farther apart or nearer together.

The opening and covering shoes H H' are turned upward at their front ends, and are connected to the front cross-bar, and near their rear ends said shoes H H' are connected to the lower ends of the discharge-spouts I I', which are provided with scatterers I² in their lower ends. The discharge tubes or spouts I I' are provided with pivoted inclined valves, J J', which are operated by the marker-arms G, which latter strike the projecting arms W W' on the upper ends of the inclined valves J J'.

The seed-hoppers L and fertilizer-hoppers L' are placed side by side, or in pairs, upon the transverse middle bar, F F', of the frame, and each hopper or receptacle is provided with an inclined discharge-opening, M, which communicates with the cups N N' in diametrically-opposite sides of the pivoted valve P. The valve P is a rock-valve in each instance, and each valve P is provided with a spring, Q, which returns it to its normal position after it has been operated to drop the seed, so that it will be ready for the next discharge. These cups N N' are bottomless, so that when they are moved over the discharge-tube the seed and fertilizers will drop through to the lower inclined valves, J J', where they will remain until one of the marker-arms in contact with the ground assumes a vertical position, when the marker-arm will strike the projecting arm W of the angle-lever W', and operate the inclined valves J J' to permit the discharge of the seed and fertilizer in the furrow, where it will be covered by the covering-shoe.

The supporting-wheels are provided with scrapers Z, which come in contact with the grooved peripheries of the wheels at points just above the ground and clean said grooved peripheries of any soil that may adhere to them.

The stems $a$ of the valves P project down through the valves proper, and also through the middle cross-bars of the main frame, and are connected by the reciprocating rod $b$, working in staples $b'$, driven over said rod $b$ into the upper faces of the longitudinal bars of the main frame. A half-loop, $c$, is secured to the reciprocating rod $b$, and within this half-loop the inner short arm, $d$, of the pivoted shifting-rod $b^2$ works to throw the rod which operates the dropping-valves in the seed and fertilizer hoppers. The inclined valves J J' are held normally closed by springs $e$ until the marker-arm strikes the projecting arm W of the angle-lever W', and operates the said inclined valves, at which time the seed and fertilizer are liberated and deposited in the furrow, where they are covered by the covering-shoes.

Having described this invention, what I claim, and desire to secure by Letters Patent, is—

1. The combination, with the main frame supported on the axle, provided with the peripherally-grooved riding-wheels, and the adjustable caster-wheel provided with the adjusting-lever at the front of said frame, of the opening and covering shoes, the discharge-spouts with inclined valves and angle-levers, the seed-hoppers and fertilizer-hoppers provided with the spring-retracted valves with seed and fertilizer cups therein, the slotted standards, the marker-shaft, and the adjustable marker arms having marker-shoes at the outer ends thereof, substantially as specified.

2. The combination, with the main frame mounted on the grooved riding-wheels, and the caster-wheel, of the hand-lever fulcrumed to the stem of the caster-wheel and provided with the toothed cam, and the vertical toothed rack on the front transverse bar of the main frame, substantially as specified.

3. The combination, with the main frame supported on the riding and covering wheels and provided with the valved seed-hoppers, of the discharge-tubes connected to the opening and covering shoes and provided with the inclined spring-pressed valves, the reciprocating rod having the curved projections, the retracting-spring, and the angle-lever, and the shaft provided with the marker-arms adapted to strike the angle-lever and operate the reciprocating rod, substantially as specified.

In testimony whereof I affix my signature in presence of two witnesses.

SAMUEL DAVIS.

Witnesses:
 THEO. MUNGEN,
 PHILIP C. MASI.